United States Patent

[11] 3,603,168

[72] Inventor Joseph Kaplan
 39 Fair Lane, Jericho, N.Y. 11753
[21] Appl. No. 1,766
[22] Filed Jan. 9, 1970
[45] Patented Sept. 7, 1971

[54] INTERMITTENT MOVEMENT MECHANISM
 9 Claims, 12 Drawing Figs.
[52] U.S. Cl. .................................................. 74/394,
 74/125.5, 74/322
[51] Int. Cl. ..................................................... F16h 35/02,
 F16d 27/00, F16h 19/00
[50] Field of Search .......................................... 74/394,
 125.5, 322, 323, 324

[56] References Cited
UNITED STATES PATENTS
2,125,769  8/1938  Crocker ........................ 74/324
2,597,357  5/1952  McCormick .................. 74/322
2,730,363  1/1956  Dietrich et al. ............... 74/394
2,845,808  8/1958  Stover .......................... 74/394
3,076,351  2/1963  Moss ............................ 74/394
3,363,480  1/1968  Murphy ........................ 74/625
FOREIGN PATENTS
486,985  9/1952  Canada ......................... 74/394

Primary Examiner—Milton Kaufman
Assistant Examiner—Wesley S. Ratliff, Jr.
Attorney—Lilling & Siegel ABSTRACT: A rotary input having a fixed displacement and an output train of planetary gearing including a rotary carrier driven by the input, planetary gearing and an output gear meshing with the planetary gearing, and cam means controlling rotation of the planetary gearing relative to its carrier.

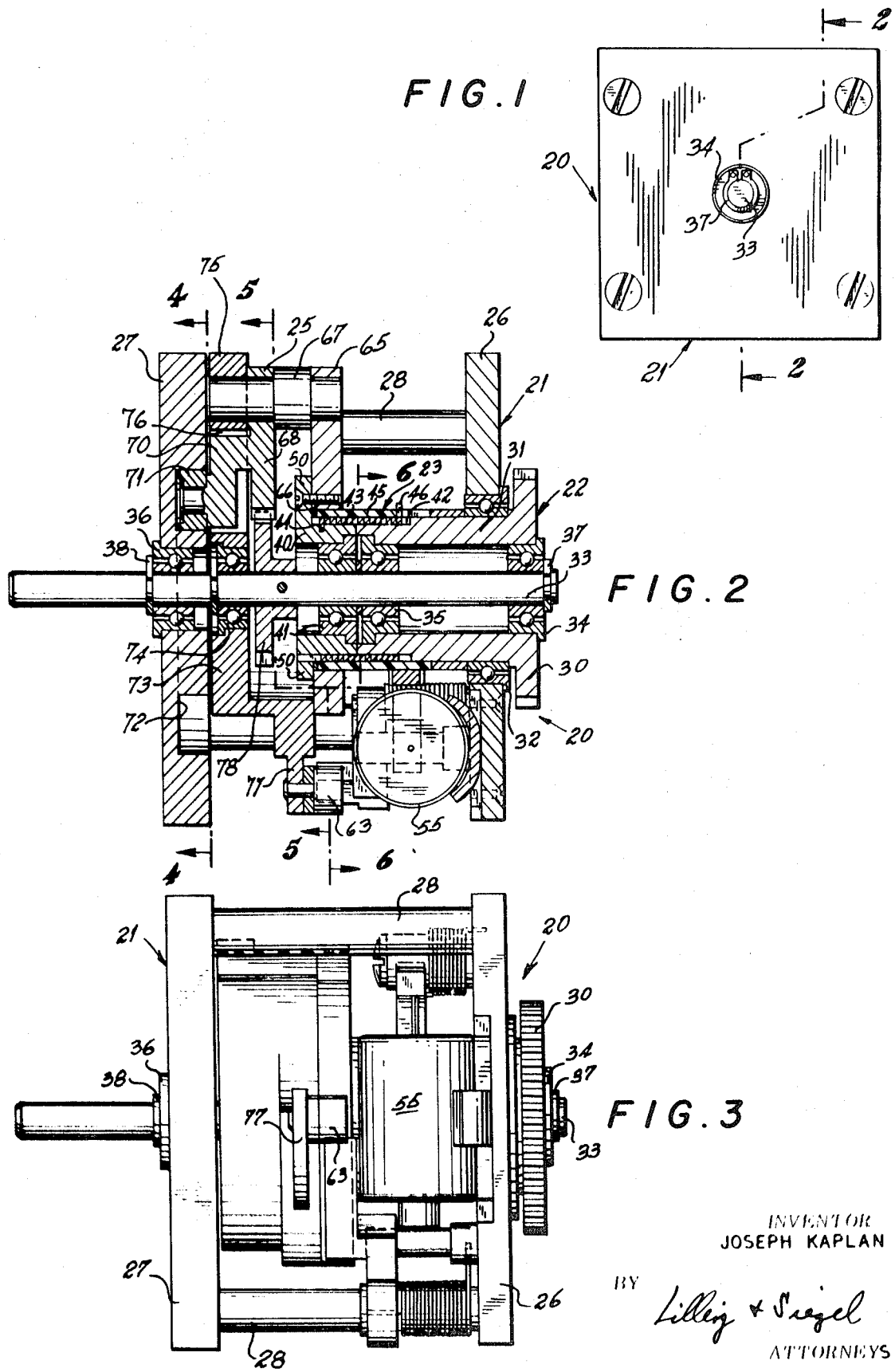

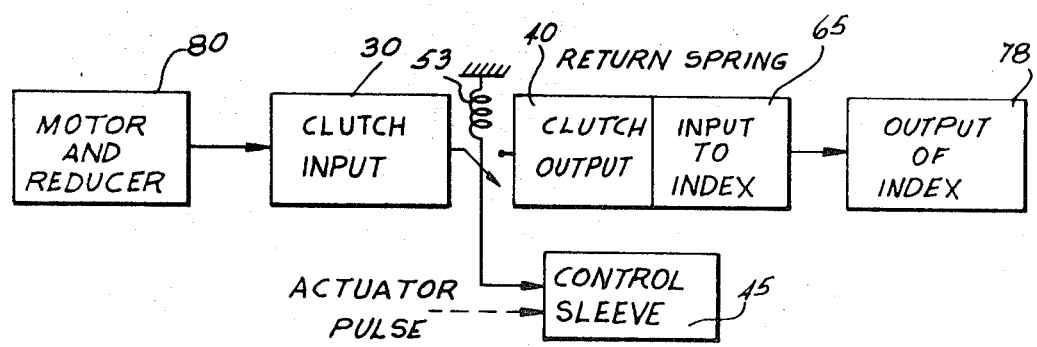
FIG. 7
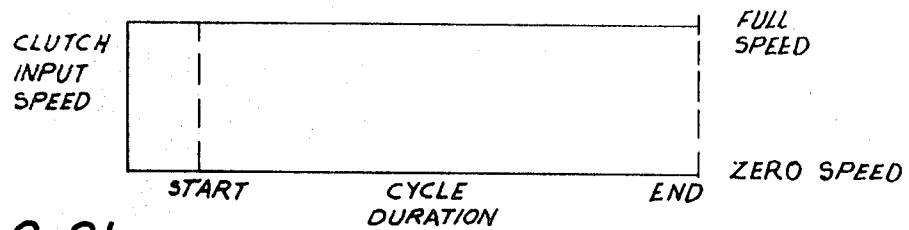
FIG. 8
FIG. 8a
FIG. 8b
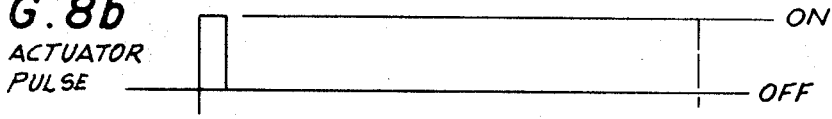
FIG. 8c
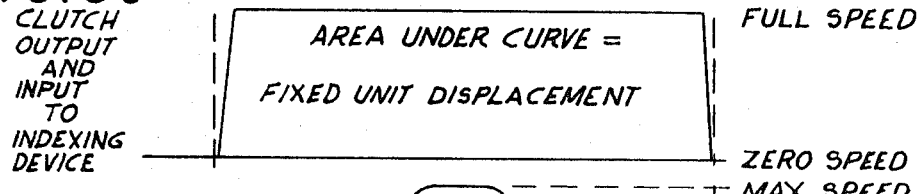
FIG. 8d
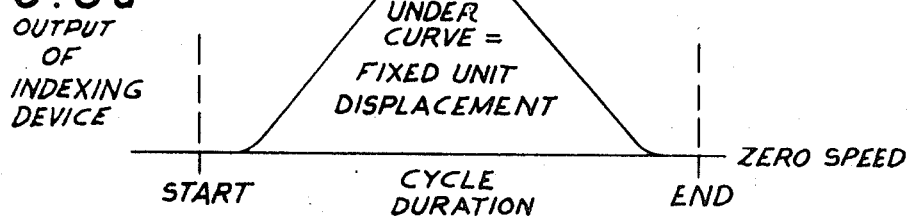
INVENTOR.
JOSEPH KAPLAN
BY Lilling & Siegel
ATTORNEYS 3,603,168

INTERMITTENT MOVEMENT MECHANISM

BACKGROUND OF THE INVENTION

The instant invention finds particular advantageous utilization in indexing or intermittent movement being produced responsive to a signal being applied to a continuous or variable speed motion. Heretofore, such intermittent motion or indexing devices necessarily involved very substantial acceleration and deceleration forces, as in starting and stopping of the intermittent movement, so that the mechanisms thereof required design characteristics compatible with such forces.

SUMMARY OF THE INVENTION

It is an important object of the present invention to provide an intermittent movement or indexing mechanism of the type described wherein the relatively high forces of acceleration and deceleration are minimized or obviated, so that prior art structural requirements of weight and strength, and resultant high cost, have been overcome.

It is a further object of the present invention to provide an intermittent motion or indexing mechanism having the advantageous characteristics mentioned in the preceding paragraph, which is uniquely advantageous in that it permits design to suit an infinite variety of requirements according to the particular acceleration profile of the machinery involved. Another important advantage obtained is the precise positioning of an output.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is an end view showing a mechanism constructed in accordance with the teachings of the present invention.

FIG. 2 is a longitudinal sectional elevational view taken generally along the offset line 2—2 of FIG. 1.

FIG. 3 is a bottom plan view of the mechanism shown in FIGS. 1 and 2.

FIG. 7 is a block diagram illustrating operation of the instant intermittent movement mechanism.

FIG. 8 and FIGS. 8a–8d illustrate graphically the time relation of the instant mechanism operation.

DESCRIPTION OF THE PREFERRED EMBODIMENT

Figure 5:
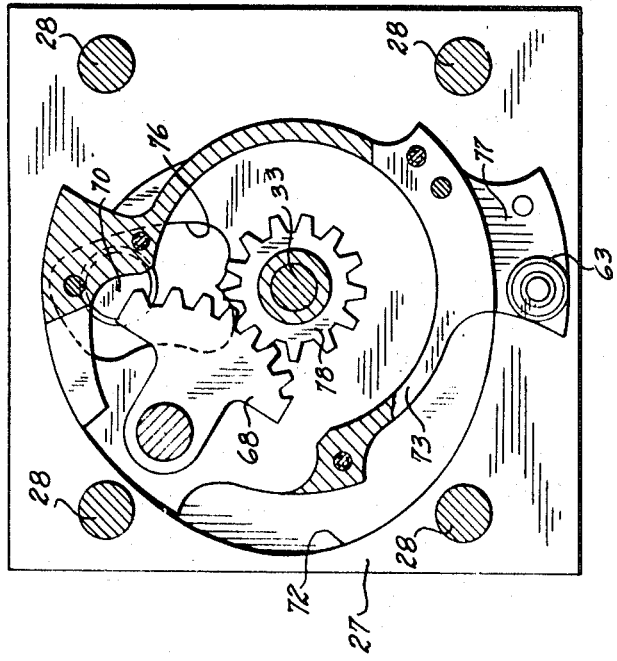
FIG. 5 is a transverse sectional elevational view taken generally along the line 5—5 of FIG. 2.

Referring now more particularly to the drawings, and specifically to FIGS. 1–3 thereof, the intermittent movement mechanism of the present invention is there generally designated 20, and may include a relatively fixed framework 21 in which the mechanism is mounted. More specifically, a rotary input means is generally designated 22, including a fixed displacement clutch 23, which transmits rotary movement to an output train of planetary gearing, generally designated 25.

The mounting structure or framework may include a pair of parallel spaced facing walls 26 and 27, say of rectangular outline configuration as illustrated, which may be fixedly secured together in their facing spaced relation by suitable tie means, such as tie bolts 28. The tie bolts 28 may be four in number, arranged in rectangular configuration, say at the corners of the end plates 26 and 27, or of other number and otherwise arranged, as desired.

The input means 22 includes a rotary member or gear 30, which may be a spur gear or other suitable gear, and provided with a tubular hub 31 extending centrally through the end wall 26 into the framework 21, being journaled in the end wall by suitable means, such as a bearing 32. A central shaft 33 may extend coaxially through the tubular hub 31, being journaled therein by a pair of bearings 34 and 35, and extending therefrom through and beyond the opposite framework end wall 27, being journaled therein by an additional bearing 36. Suitable retaining means, such as spring clips 37 and 38 may be employed to retain the shaft 33 in proper relation with respect to bearings 34 and 36.

The clutch 23 of the input means 22 includes an output drum or tubular member 40 rotatably circumposed coaxially about the shaft 33, being journaled thereon by suitable bearing means 41. The hub 31 may have one external end portion reduced, as at 42, to define a drum in coaxial alignment with the drum 40. A resilient coil or clutch spring 43 of helical configuration is circumposed about both the aligned drums 42 and 40, having one end anchored to the latter or output drum, as at 44. Surrounding the helical spring 43 is a clutch sleeve 45, which extends in spaced circumposition about the drums 42 and 40, while the spring end 46, remote from spring end 44, is anchored to the surrounding sleeve 45. The sleeve 45 is provided externally at one location thereon with a lug or tooth 47, best seen in FIG. 6.

Circumposed about and projecting radially outwardly from the drum 40 is a circumferential flange or lip 50, to which is mounted the output planetary gearing 25.

Figure 6:
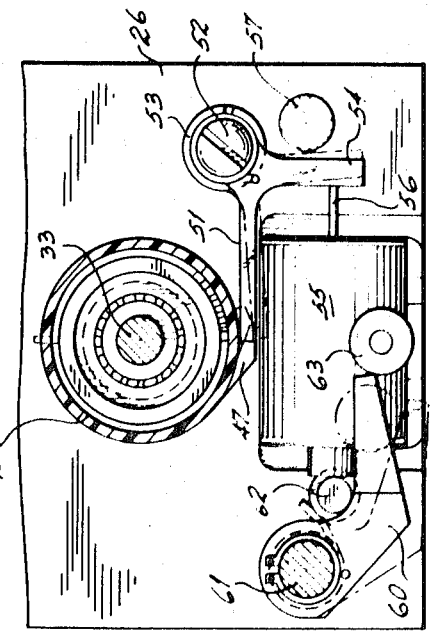
FIG. 6 is a partial transverse sectional elevational view taken generally along the line 6—6 of FIG. 2.

A pawl 51 is mounted at one end for pivotal movement about a pin 52 fixed to one end plate 26. The pawl is provided with suitable resilient means 53, such as a coil spring about the pin 52, normally resiliently urging the pawl 51 about the pin 52 to a position generally tangent to the sleeve 45, as best seen in FIG. 6. In this position, it will be apparent that the free end of the pawl 51 is in abutting engagement with the stud or catch 47 to hold the sleeve 45 against rotation. The pawl 51 is swingable against the force of spring 53 from its solid line position, see FIG. 6, to its phantom to release the stud 47 and permit rotation of the sleeve 45. A right angle extension 54 is provided on the pawl 51, adjacent to the pin 52, and a solenoid 55 is mounted on the framework end plate 26 with its plunger 56 engageable with arm 54 to swing the latter and its associated pawl 51 to its phantom position releasing the sleeve 45. A stop member 57 may be fixed to the plate 26 limiting swinging movement of arm 54.

An additional pawl 60 is rotatable about a pin 61 fixed to end plate 26 and resiliently urged counterclockwise, as seen in FIG. 6 into limiting engagement with a pin 62 also fixed to the plate 26. The pawl 60 is engageable with a roller 63 carried by the planetary gear train 25 upon rotation of the latter.

Figure 4:
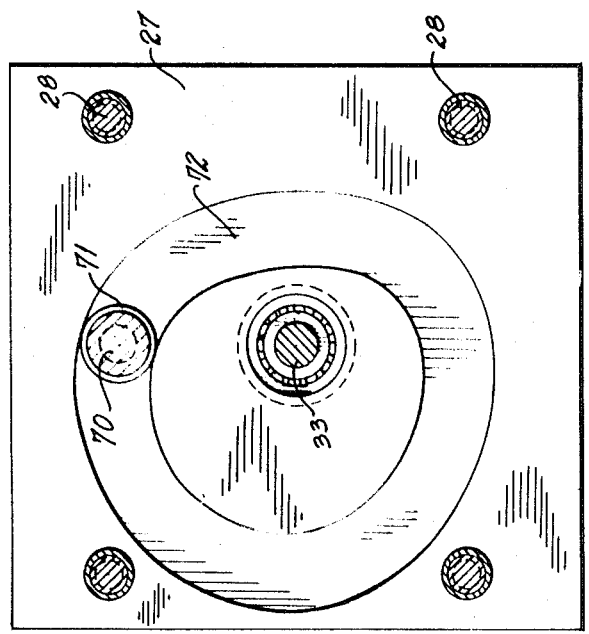
FIG. 4 is a transverse sectional elevational view taken generally along the line 4—4 of FIG. 2.

The planetary gear train 25 includes a rotary carrier or cage 65 which is fixed to the output drum 40 of input means 22, as by fasteners 66, for rotation with the drum 40 about the central axis of shaft 33. The carrier 65, being secured at its radially outer region with a shaft 67 generally parallel to the central shaft 33 and rotatable with the carrier 65 in parallelism with and about the axis of shaft 33. The planetary shaft 67 carries a planetary gear 68, or gear segment, rotatable with the carrier 65 about the coaxial shaft 33, and also rotatable relative to the carrier about the offset parallel axis of shaft 67. Thus, gear 68 is a planetary gear, and retained on the shaft 67 by any suitable retaining means. An offset extension or crank arm 70 extends from the planetary gear 68 and is provided on its distal end with a roller 71 disposed with its axis generally parallel to and offset from the axes of shaft 33 and shaft 67. Further, the framework end plate 27 is formed with a slot, groove or recess 72, which assumes a closed configuration extending about the central axis 33, see FIG. 4, and which receives the roller 71. That is, the roller 71 moves along the groove or recess 72, the latter being noncircular in the illustrated embodiment, upon rotation of planetary gear 68 with planetary gear carrier 65, so that the angular disposition of the planetary gear relative to its mounting shaft 67, and consequent rotation of the planetary gear relative to carrier 65, are thereby controlled by engagement of roller 71 along groove 72. It will therefore by appreciated that the groove 72 defines a cam, or the walls of the groove may be considered as defining a cam, which cam is fixed by its location in the end plate 27. Also, the roller 71 on offset extension 70 may be considered as a cam follower moving along the cam 72.

A carrier or cage addition includes a plate 73 rotatably journaled on the central shaft 33 by a bearing 74 and having a radial extension 75 serving to support an end of shaft 67. The carrier addition plate 73 is open or cut out at 76 to pass therethrough the offset extension or follower 70.

Further, the carrier addition 73 is formed with an offset extension 77 carrying the rotatable member or roll 63 discussed hereinbefore.

Interposed between the carrier 65 and the carrier addition 73, circumposed about the shaft 33 and keyed thereto is an output gear 78, which may be a spur gear in meshing engagement with the teeth of planetary gear 68. Thus, the shaft 33 is driven together with the output gear 78 through the planetary gearing 25.

In operation, an input motion, say a constant speed rotary motion is imparted to the gear 30 from any suitable power source. The clutch 23 remains disengaged so long as the pawl 51 abuts the lug 47, so that no motion is transmitted through the clutch. However, upon energization of the solenoid 55 to swing the pawl 51 counterclockwise, as illustrated in FIG. 6, the lug 47 is released and the spring 43 serves to couple the drums 42 and 40 for transmission of motion therebetween to the carrier 65. The carrier rotates and with it carries the planetary gear 68, which rotates both with the carrier and relative to the carrier as controlled by its cam follower 70 in following engagement with the cam 72.

In practice, the solenoid 55 is energized by a pulse to momentarily release the lug 47 from the pawl 51, after which the solenoid may be deenergized to return the pawl for abutting engagement with the lug upon a single revolution or fraction thereof. Thus, the clutch 23 may be considered as a single revolution clutch or a fractional revolution clutch.

This fixed displacement is transmitted to carrier 65 which moves the planetary gear 68 about the axis of shaft 33 a limited amount of rotation or a single revolution. Simultaneously, the planetary gear 68 is caused to rotate about the axis of shaft 67, that is relative to the carrier 65, to cause a desired intermittent movement of output gear 78. In practice, the cam 72 is configured such that initial rotation of the carrier 65 effects a substantially pure rolling action of the planetary gear 68 relative to output gear 78, after which the relative rotation between planetary gear 68 and 78 may increase to achieve the desired rotative movement of output shaft 33. Upon return toward or approach to the end of a limited rotation or a single revolution of carrier 65, the cam 72 again preferable causes a rolling action of the planetary gear 68 relative to the output gear 78, so that deceleration forces are relatively slight. Thus, even upon constant rotation of the carrier 65, there would be an intermittent movement of the output gear 78 and its shaft 33, this cessation of movement or dwell being located at the stop or dead position of the input means 22.

The above-described operation may be simplified by reference to FIG. 7, wherein a source of constant speed rotative movement or power may be generally designated 80, as a motor and speed reducer, which is operatively connected in driving relation with respect to the input gear 30 of the clutched input means 22. The control sleeve 45 is interposed between the input gear 30 and output 40 of the clutched input means. The return spring effects disengagement of the clutch 23 upon cessation of the actuator pulse to disengage the clutch. The output drum 40 of the clutch 23 is directly coupled to the input or carrier 65 of the planetary gearing index means, which transmits the desired movement to the output gear 78.

The operation may be better understood by reference to the graphs of FIG. 8, it will there be seen in FIG. 8a that the clutch input speed may continue constantly at a predetermined full speed. In the graph of FIG. 8b it will appear that an actuator pulse may occupy but a relatively short proportion of the cycle duration.

In the graph of FIG. 8c it will appear that the actuator pulse is sufficiently long to engage the clutch means 33 for a limited angular rotation or single revolution, as in the illustrated embodiment, the speed of the clutch output drum 40 accelerating sharply upon start up and decelerating sharply upon cessation, as indicated by the slopes at the beginning and end of the curve of FIG. 8c.

As discussed hereinbefore, the relatively high acceleration and deceleration movements, and consequent forces, are considerably reduced by the configuration of cam 72 which extends the periods of starting and stopping while achieving the desired displacement per cycle. This is shown in FIG. 8d wherein output movement is zero during the high acceleration and deceleration periods of clutch engagement and disengagement, while velocity increase and decrease of the output gear 78 and shaft 33 is relatively slow to minimize the forces there involved.

As the clutch 23 is disengaged when the pawl 51 abuts the lug 47, the planetary gear train 25 is, to some degree, relatively freely rotatable, and to prevent such rotation, the roller 63 is angularly located on the carrier addition 73 to snap beyond the end of pawl 60 when the sleeve 45 rotates into its disengagement position. This condition is shown in solid lines in FIG. 6.

From the foregoing, it is seen that the present invention provides an intermittent movement mechanism or indexing device which fully accomplishes its intended objects and is otherwise well adapted to meet practical conditions of manufacture and use.

Although the present invention has been described in some detail by way of illustration and example for purposes of clarity of understanding, it is understood that certain changes and modifications may be made within the spirit of the invention.

What is claimed is:

1. An intermittent movement mechanism comprising rotary input means, a fixed displacement clutch interposed in said input means, and an output train of planetary gearing comprising a driven rotary carrier, a planetary gear carried by said carrier for rotation therewith and rotation relative thereto, a rotary output gear in meshing driven engagement with said planetary gear, and cam means operatively connected to said planetary gear for controlling the rotation thereof relative to said carrier to effect intermittent movement of said output gear.

2. An intermittent movement mechanism according to claim 1, said clutch comprising a single revolution clutch.

3. An intermittent movement mechanism according to claim 1, said output gear comprising a sun gear.

4. An intermittent movement mechanism according to claim 1, said cam means comprising a fixed cam, and a cam follower carried by said planetary gear and engageable with said cam upon rotation of said planetary gear with said carrier.

5. An intermittent movement mechanism according to claim 4, said cam being configured to cause rolling movements of said planetary gear relative to said output gear through a portion of carrier rotation, whereby said output gear remains stationary during said portion of carrier rotation.

6. An intermittent movement mechanism according to claim 5, said clutch comprising a single revolution clutch having its disengaged position corresponding to said portion of carrier rotation, whereby high acceleration and deceleration forces are not transmitted to said output gear.

7. An intermittent movement mechanism according to claim 5, said output gear comprising a sun gear coaxial with said carrier.

8. An intermittent movement mechanism according to claim 7, said cam having a closed configuration extending about the axis of said carrier and sun gear.

9. An intermittent movement mechanism according to claim 8, said cam follower comprising an eccentric carried by said planetary gear in following relation with said cam.